United States Patent [19]

Aiba

[11] Patent Number: 5,477,261
[45] Date of Patent: Dec. 19, 1995

[54] POLYGON MIRROR, A SCANNING APPARATUS AND AN IMAGE FORMING APPARATUS USING THE SAME

[75] Inventor: Masahiko Aiba, Nara, Japan

[73] Assignee: Sharp Kabushiki Kaisha, Osaka, Japan

[21] Appl. No.: 379,099

[22] Filed: Jan. 26, 1995

Related U.S. Application Data

[63] Continuation of Ser. No. 857,775, Mar. 26, 1992, abandoned.

[30] Foreign Application Priority Data

Mar. 28, 1991 [JP] Japan ..................... 3-064319

[51] Int. Cl.$^6$ .......................................... B41J 2/42
[52] U.S. Cl. .......................................... 347/259
[58] Field of Search ........................... 347/259, 268, 347/243, 241, 134

[56] References Cited

U.S. PATENT DOCUMENTS 4,692,629  9/1987  Nakamura ..................... 250/560
5,130,840  7/1992  Iima et al. ..................... 359/220

FOREIGN PATENT DOCUMENTS 49-28355  of 1974  Japan.

*Primary Examiner*—Mark J. Reinhart
*Attorney, Agent, or Firm*—David G. Conlin; Kevin J. Fournier

[57] ABSTRACT

An image forming apparatus comprising a laser optical system for optical scanning on a photosensitive drum. The laser optical system comprises a polygon mirror having mirror surfaces with an inclination of an angle θ. The polygon mirror is rotated with each mirror surface inclined by the angle θ to a line normal to the scanning plane, while the incident light beams to the polygon mirror are inclined by an angle 2θ to the scanning plane, so as to compensate the inclination of the mirror surfaces of the polygon mirror. In this way, the polygon mirror can be easily manufactured by plastic molding without damaging the mirror surfaces.

13 Claims, 5 Drawing Sheets

POLYGON MIRROR, A SCANNING APPARATUS AND AN IMAGE FORMING APPARATUS USING THE SAME

This is a Continuation of application Ser. No. 07/857,775 filed Mar. 26, 1992 now abandoned.

BACKGROUND OF THE INVENTION

1. Field of the Invention

The present invention relates to an image forming apparatus in which light beams from a light source are radiated onto a photosensitive drum through a rotating polygon mirror to effect an optical scanning, and more particularly, so as to form an electrostatic latent image on the photosensitive drum.

2. Description of the Prior Art

One example of an image forming apparatus employing an optical scanning is a laser beam printer. A laser beam printer uses a rotating polygon mirror and laser beams for effecting the optical scanning on a photosensitive drum. The polygon mirror used for such an image forming apparatus requires high precision. In particular, the mirror surfaces thereof must be precisely finished, and the inclinations of the mirror surfaces must be precisely controlled. Any variation of the inclinations between the mirror surfaces produces a significant error on a printed surface.

Referring to FIG. 6, the manner in which an inclination of the mirror surface affects the displacement of light beam spots on a photosensitive drum 9 will be described. As is shown in FIG. 6, a conventional image forming apparatus comprises an optical system including a polygon mirror 32, a motor 33 and a lens 34. When the resolution of the imaging forming apparatus is 300 dpi, the pitch of dots is approximately 85 μm (25.4/300). In this case, the allowable error of the radiated light beam spots on the photosensitive drum should be approximately 20 μm. When the maximum allowable inclination angle of the mirror surfaces of the polygon mirror is $\alpha$, the error e of the light beam spots on the photosensitive drum 9 is $L\tan 2\alpha$, where L is the optical path length. When L is 180 mm, in order to obtain the error e of 20 μm or less as is mentioned above, the maximum allowable inclination angle $\alpha$ must be as small as 0.003° (approximately 11 seconds).

In order to meet this strict requirement, conventional polygon mirrors have been manufactured of hard aluminum base material by an ultra-precision processing method.

In recent developments involving high-precision plastic molding, a high-fluidity resin whose thermal contraction at molding has been greatly reduced has been developed. Such a resin can copy surfaces of the mold precisely, to the level of mirror surfaces, for example. Such a plastic molding resin and technique have been applied in the present field to manufacture a highly precise plastic polygon mirror. However, in the process of molding the polygon mirror, as is shown in FIGS. 7 and 8, there arises a problem as is described below.

In FIGS. 7 and 8, the reference numerals 35, 37, 38 and 39 denote a mold base, right and left slide molds, and an upper mold, respectively. These mold components are assembled into a unit as is shown in FIG. 8. A resin is injected from a resin inlet 36. After the resin is cooled and hardened, the molded polygon mirror is taken out with a pin while the mold components are separated in the directions shown by the arrows in FIG. 7. At this time, the side faces of the polygon mirror, that is, the mirror surfaces thereof, are liable to be scratched with the edges of the mold shown by dotted circles in FIG. 9.

The objective of the present invention is to solve the above-described problem and to provide an image forming apparatus using a polygon mirror having mirror surfaces which are not damaged when it is molded.

SUMMARY OF THE INVENTION

The image forming apparatus of this invention, which overcomes the above-discussed and numerous other disadvantages and deficiencies of the prior art, comprises an optical system including a rotating polygon mirror for reflecting light beams emitted from a light source to effect an optical scanning on a photosensitive drum in an axial direction thereof to form an electrostatic latent image on the photosensitive drum, wherein the polygon mirror has a plurality of mirror surfaces each having an inclination of angle $\theta$ relative to a rotational axis of the polygon mirror, and the polygon mirror is rotated so that each mirror surface is inclined by the angle $\theta$ to a line normal to the scanning plane, while the incident light beams to the polygon mirror are inclined by an angle $2\theta$ to the scanning plane.

Alternatively, the image forming apparatus comprises an optical system including a rotating polygon mirror for reflecting light beams emitted from a light source to effect an optical scanning on a photosensitive drum in an axial direction thereof to form an electrostatic latent image on the photosensitive drum, wherein the polygon mirror has a plurality of mirror surfaces each having an inclination of angle $\theta$ relative to a rotational axis of the polygon mirror, and the polygon mirror is rotated so that each mirror surface is vertical to the scanning plane, while the incident light beams to the polygon mirror are on a plane including the scanning plane.

According to another aspect of the present invention, a polygon mirror is provided, which comprises an axis about which the polygon mirror can be rotated, and a plurality of mirror surfaces, each having an inclination of angle $\theta$ relative to the axis, the angle $\theta$ being non-zero.

According to yet another aspect of the present invention, a scanning apparatus is provided, which comprises a polygon mirror including an axis about which the polygon mirror can be rotated, and a plurality of mirror surfaces, each having an inclination of angle $\theta$ relative to the axis, the angle $\theta$ being non-zero, means for rotating the polygon mirror about the axis, and means for projecting incident light beams onto the plurality of mirror surfaces to effect an optical scanning.

In a preferred embodiment, the polygon mirror has a molded construction.

In a preferred embodiment, the polygon mirror is molded with a high-fluidity resin.

In a preferred embodiment, the scanning apparatus further comprises means for transforming the optical scanning into an electrostatic image.

In a preferred embodiment, the means for transforming comprises a photosensitive drum.

In a preferred embodiment, the light beams are incident on the plurality of mirror surfaces at an angle $2\theta$ relative to a plane normal to the axis.

According to the image forming apparatus of the present invention, the incident angle of the light beams to each mirror surface of the rotating polygon mirror is preset to $2\theta$ relative to the scanning plane. Therefore, the polygon mirror having mirror surfaces with an inclination of angle θ can be used for the image forming apparatus without the problem of displacement of the light beam spots on the photosensitive drum.

Alternatively, each mirror surface of the rotating polygon mirror is set vertical relative to the scanning plane, and the incident light beams to the mirror surface of the polygon mirror are on a plane including the scanning plane. Therefore, as in the first case, the polygon mirror having mirror surfaces with an inclination of angle θ can be used for the image forming apparatus.

In either case, when the polygon mirror is manufactured by plastic molding, the mirror surfaces thereof can be designed to have a specified inclination of angle θ. The polygon mirror having such inclined mirror surfaces can be removed easily from the mold without the mirror surfaces being scratched with the edges of the mold.

Thus, the present invention makes possible the objective of providing an image forming apparatus capable of using a polygon mirror having mirror surfaces which are not damaged when it is molded, and thereby providing a highly reliable image forming apparatus.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

Figure 1:
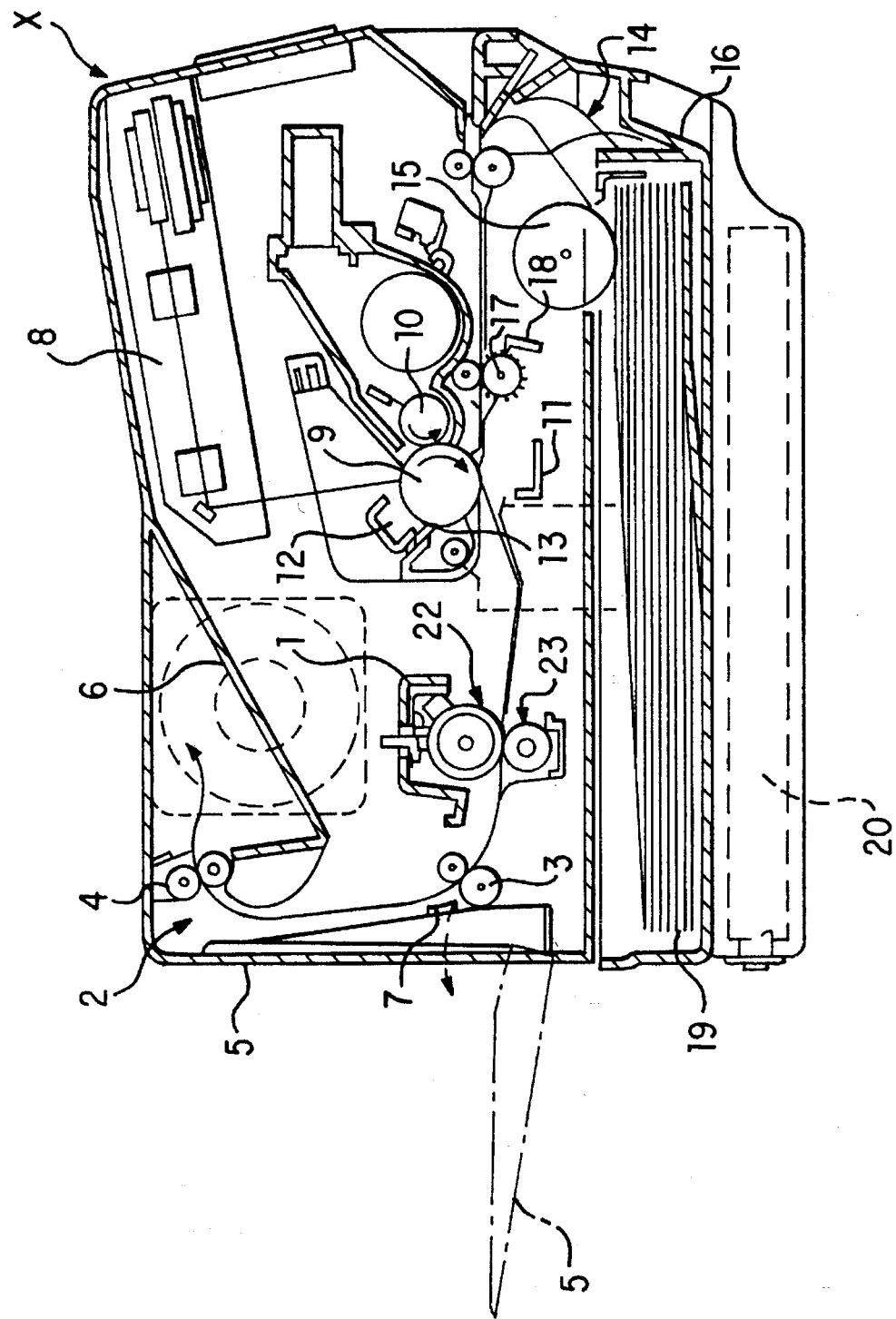
FIG. 1 shows an overall structure of an image forming apparatus according to the present invention.

FIG. 1 schematically shows a laser beam printer according to the present invention, which comprises a body X having a laser optical system 8. Referring to FIG. 1, code signals sent from an outer system apparatus are input through an interface into a controller 20, where the signals are converted to dot patterns and then to time sequential signals. The converted signals are then introduced to a driver circuit of the laser optical system 8 so as to modulate laser beams generated by a semiconductor laser 30 (see FIG. 2) of the laser optical system 8.

The modulated laser beams are reflected from a polygon mirror 32 (see FIG. 2) of the laser optical system 8 rotating at a high speed, so as to effect an optical scanning on a photosensitive drum 9 in the direction of the axis thereof.

The circumferential surface of the photosensitive drum 9 has been uniformly charged with a certain polarity by means of a charging device 12. This allows an electrostatic latent image to be formed on the surface of the photosensitive drum 9. The electrostatic latent image on the photosensitive drum 9 is then developed by means of a developing device 10.

The developed toner image on the photosensitive drum 9 is transferred onto a transfer sheet by means of a transfer device 11. The transfer sheet has been transported to the photosensitive drum 9 in a manner detailed below by means of a sheet feed device 14 which comprises a pickup roller 15, a PF roller 16, a PS roller 17 and a PF solenoid 18. The transfer sheet is picked up from a sheet cassette 19 by means of the pickup roller 15 and transported through the PF roller 16 to the position of the PS roller 17, where the transfer sheet is fed to the photosensitive drum 9 synchronously with the rotation of the photosensitive drum 9 so that the transfer sheet overlaps the developed image on the photosensitive drum 9. Toner left on the photosensitive drum 9 after the transfer operation is removed off by means of a cleaning device 13.

The transfer sheet having the toner image thereon is separated from the photosensitive drum 9 and transported to a fixing device 1, so that the toner image on the transfer sheet is fixed by means of upper and lower pressure rollers 22 and 23 of the fixing device 1. The transfer sheet is then ejected outside the body X by means of an ejecting device 2.

The ejecting device 2 includes a lower ejecting roller 3, an upper ejecting roller 4, a face-up tray 5, and a face-down tray 6. The face-up tray 5 is disposed adjacent to the lower ejecting roller 3 on the side downstream thereof, and opens or closes pivotally around the axis thereof transverse to the length of the body X. The face-down tray 6 is disposed on the side downstream of the upper ejecting roller 4. The ejecting device 2 further includes a switch guide 7 which allows the transfer sheet to be ejected outside the body X under two conditions which can be selected; a face-up condition at which the face-up tray 5 is open and the transfer sheet past the lower ejecting roller 3 is ejected to the open face-up tray 5, and a face-down condition at which the face-up tray 5 is closed and the transfer sheet past the lower ejecting roller 3 is ejected to the face-down tray 6 through the upper ejecting roller 4.

Figure 2:
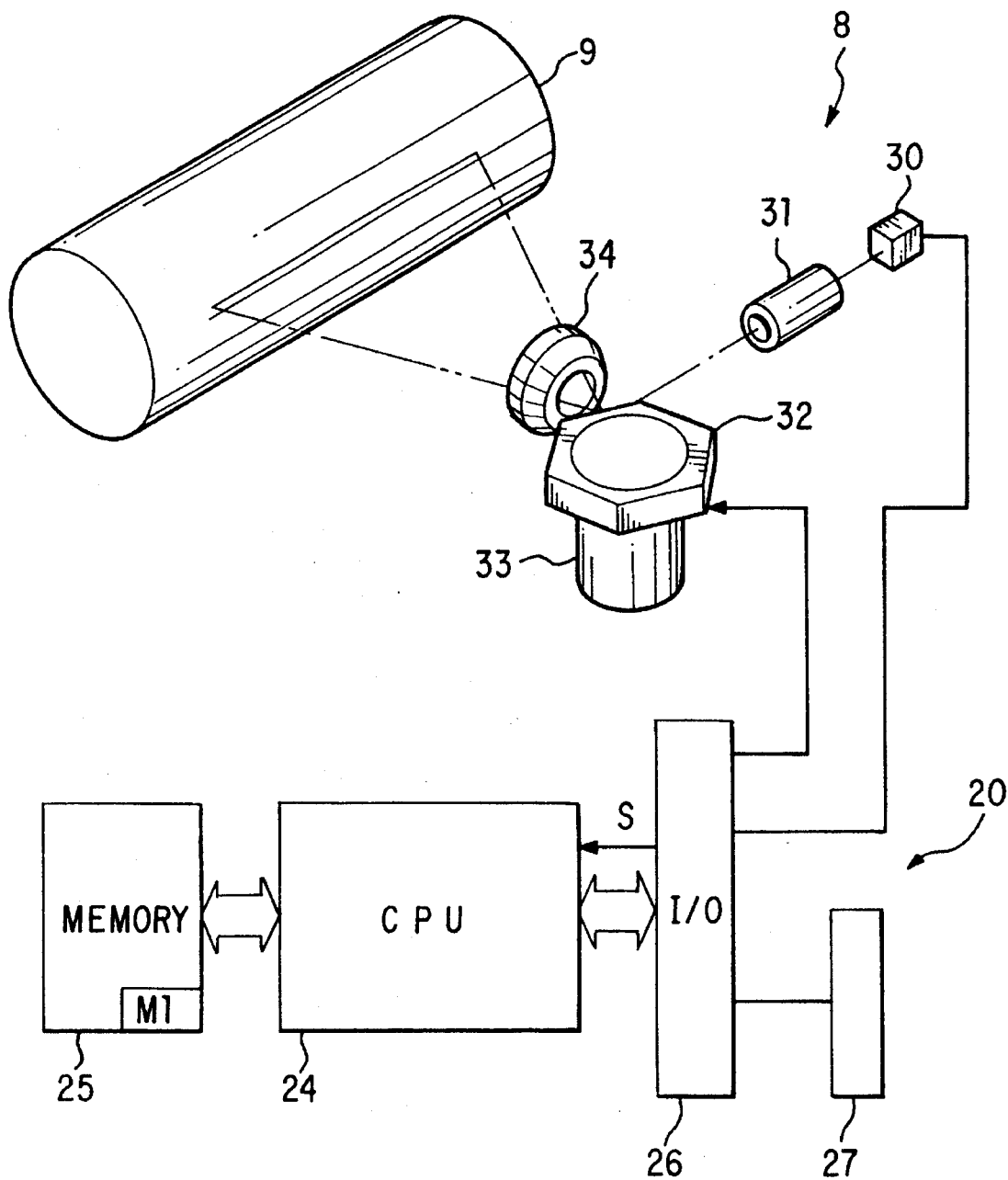
FIG. 2 is a schematic view of an optical system and control of the image forming apparatus of FIG. 1 according to the preset invention.

FIG. 2 shows the structure of the laser optical system 8 in association with the photosensitive drum 9 and the controller 20. Light beams emitted from the semiconductor laser 30 are made parallel with a collimator lens 31 and directed to one of the mirror surfaces of the polygon mirror 32. The polygon mirror 32 which is hexagonal abuts against the rotating shaft of a motor 33. The light beams are reflected from the mirror surface of the polygon mirror 32 and are directed to the photosensitive drum 9 through a fθ lens 34. The incident angle of the light beams to the mirror surface of the polygon mirror 32 sequentially varies as the polygon mirror 32 rotates, and thereby the light beams reflected from the mirror surface moves right and left over a predetermined range, so as to effect an optical scanning. The fθ lens 34 controls the direction of the light beams so that the focal points of the light beams are linearly aligned on the surface of the photosensitive drum 9 and the range of the scanning is constant irrespective of the rotation of the photosensitive drum 9.

Print data are input to a CPU 24 of the controller 20 through an I/O interface 26 from a terminal 27 which is, for example, RS232C or RS422 based. The CPU 24 converts the print data to image data in accordance with a program stored in a memory 25, and the converted data with a predetermined resolution are sent to the semiconductor laser 30 of the optical system 8.

A signal S indicating the rotation of the polygon mirror 32 also is input to the CPU 24 through the I/O interface 26. The signal S is generated when each mirror surface passes a fixed point, which means that the signal S is input to the CPU 24 six times for one rotation of the polygon mirror 32. Each signal S is used as a mark to indicate the start of each line of scanning.

Figure 3:
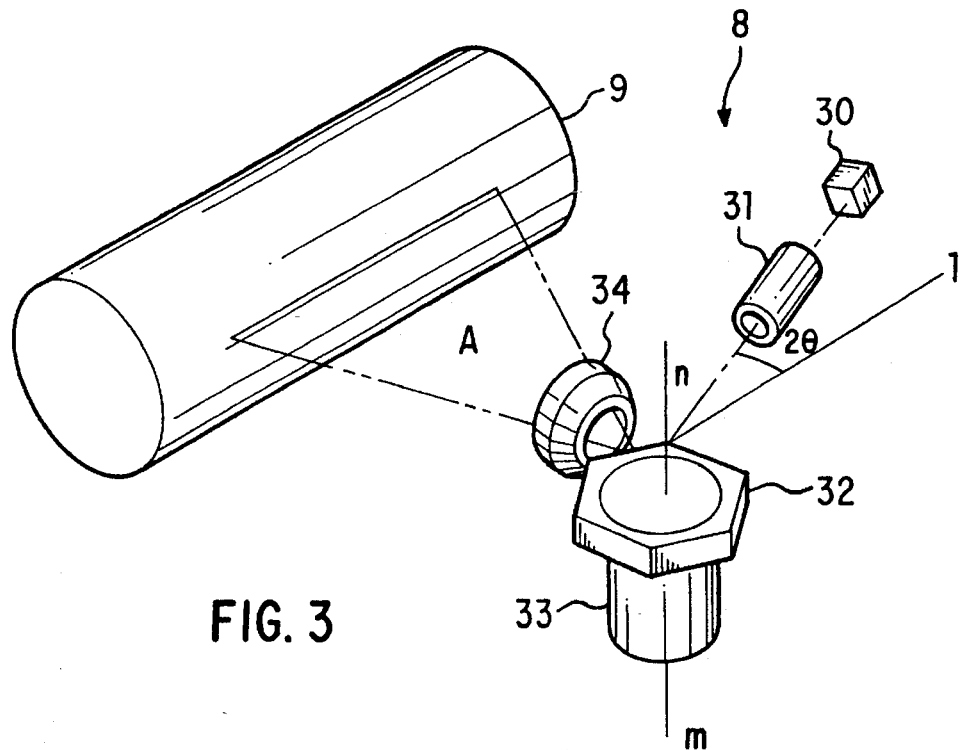
FIG. 3 is a detailed view of the optical system of FIG. 2 according to the present invention.
Figure 4:
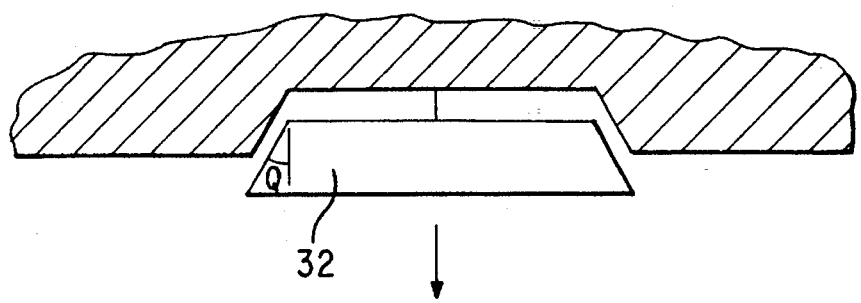
FIG. 4 shows a shape of a polygon mirror used in the optical system of FIG. 2 when removed from a mold according to the present invention.

Referring now to FIG. 3, the structure of the optical system 8 will be further described in detail. Each mirror surface of the polygon mirror 32 is inclined by an angle $\theta$ to the rotational axis of the polygon mirror as is shown in FIG. 4. In FIG. 3, A is a plane on which the light beams pass when the scanning is effected on the photosensitive drum 9. A straight line 1 is on the same plane as the plane A, and a straight line m crosses the plane A at right angles. The line m is the axis for rotating the polygon mirror 32 and is parallel with the rotating shaft of the motor 33, for example. Therefore, the polygon mirror 32 is rotated under such a condition that each mirror surface of the polygon mirror 32 is inclined by an angle $\theta$ relative to a line normal to the plane A.

On the other hand, a straight line n is an incident light axis of the light beams emitted from the semiconductor laser 30, which is deviated from the line 1 by an angle $2\theta$. In other words, the light beams are radiated to the mirror surface of the polygon mirror 32 at the angle $2\theta$ with respect to the plane A. In this way, the inclination angle $\theta$ of the polygon mirror 32 is corrected.

Figure 5:
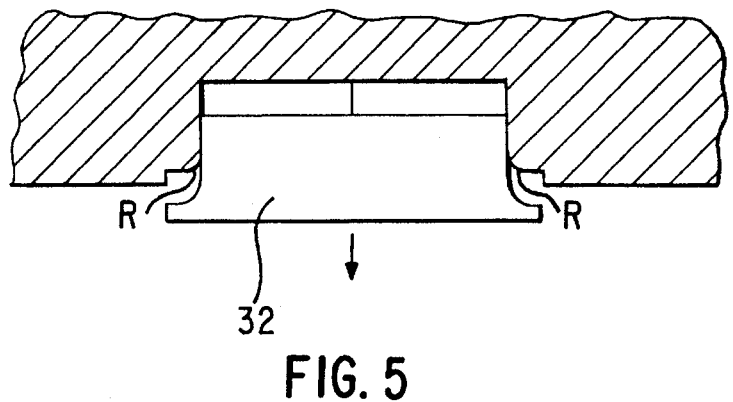
FIG. 5 shows a polygon mirror partially improved.
Figure 6:
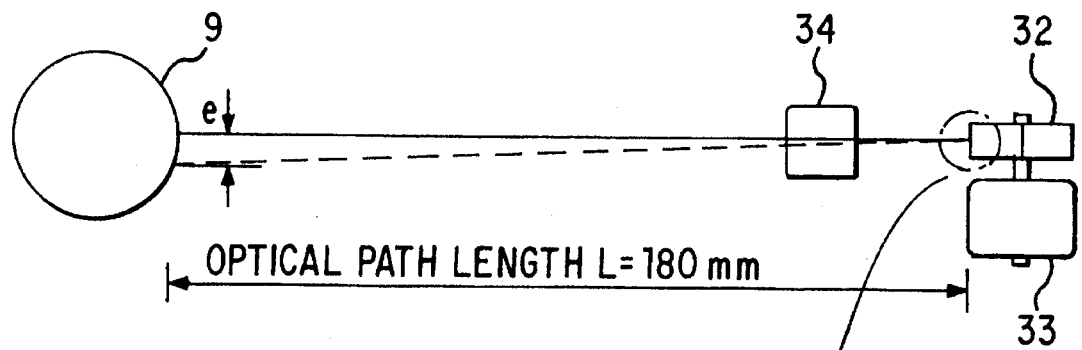
FIG. 6 shows a displacement of light beam spots on a photosensitive drum caused by an inclination of the mirror surface of a polygon mirror.
Figure 6:
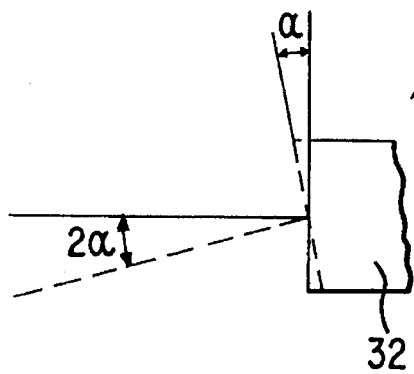
Figure 7:
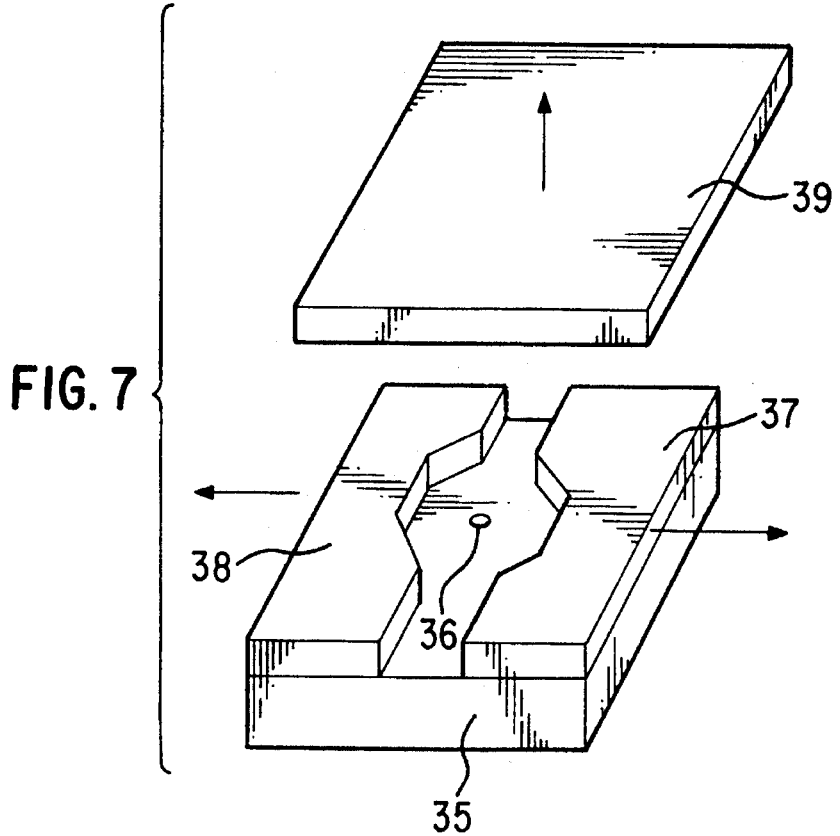
FIGS. 7 and 8 show a process of plastic molding of a polygon mirror.
Figure 8:
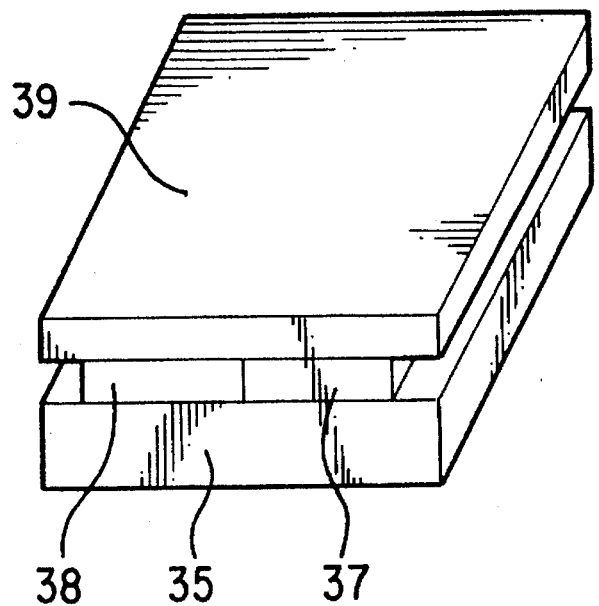
Figure 9:
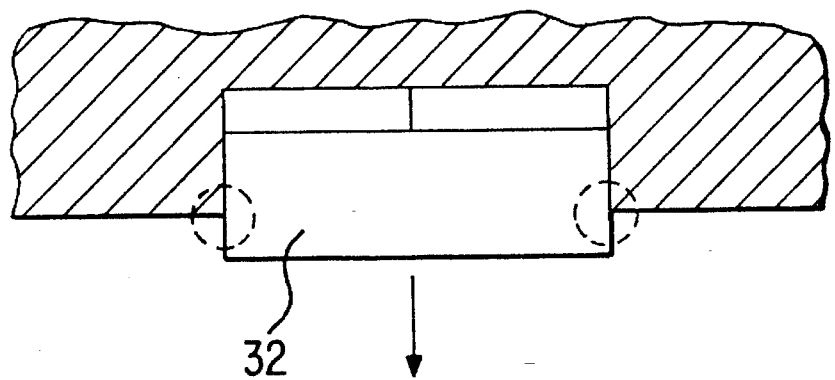
FIG. 9 shows a defect of a conventional image forming apparatus.

According to the above-described structure, the polygon mirror having an inclination of angle $\theta$ can be used for an image forming apparatus. Therefore, when the polygon mirror 32 is manufactured by plastic molding, a mold in which the faces have an inclination of angle $\theta$, at least, can be used. As a result, the polygon mirror 32 can be removed from the mold smoothly without scratches on the mirror surfaces of the polygon mirror 32, as shown in FIG. 4. Incidentally, the mirror surfaces can be protected from being damaged if curved portions R are formed at the edges of the otherwise conventional mold of FIG. 9, as is shown in FIG. 5.

Alternatively, when the polygon mirror 32 having an inclination of angle $\theta$ is used for an imaging forming apparatus, the polygon mirror 32 can be positioned so that the mirror surface faces to the photosensitive drum 9 standing vertical to the plane A. In this case, the axis of the rotating polygon mirror 32 (the rotating shaft of the motor 33, for example) should be inclined toward the plane A by the angle $\theta$. Also, the semiconductor laser 30 should be arranged so that the incident light axis n is identical to the line 1. In this structure, the same function and effect as those of the former example can be obtained.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An image forming apparatus comprising an optical system including a rotating polygon mirror for reflecting light beams emitted from a light source to effect an optical scanning on a photosensitive drum in an axial direction thereof to form an electrostatic latent image on the photosensitive drum, wherein the polygon mirror has a plurality of mirror surfaces each having an inclination of angle non-zero $\theta$ $\theta \neq 90° \times n$; n is an integer relative to a rotational axis of the polygon mirror, and the polygon mirror is rotated so that each mirror surface is inclined by the angle $\theta$ to a line normal to a scanning plane, while incident light beams to the polygon mirror are inclined by an angle $2\theta$ to the scanning plane.

2. An image forming apparatus according to claim 1, wherein the polygon mirror is molded with a high-fluidity resin.

3. An image forming apparatus comprising an optical system including a rotating polygon mirror for reflecting light beams emitted from a light source to effect an optical scanning on a photosensitive drum in an axial direction thereof to form an electrostatic latent image on the photosensitive drum, wherein the polygon mirror has a plurality of mirror surfaces each having an inclination of angle non-zero $\theta$ $\theta \neq 90° \times n$; n is an integer relative to a rotational axis of the polygon mirror, and the polygon mirror is rotated so that each mirror surface is vertical to a scanning plane, while incident light beams to the polygon mirror are on a plane including the scanning plane.

4. An image forming apparatus according to claim 3, wherein the polygon mirror is molded with a high-fluidity resin.

5. A polygon mirror, comprising:

an axis about which the polygon mirror can be rotated; and a plurality of mirror surfaces, each having an inclination of angle non-zero $\theta$ $\theta \neq 90° \times n$; n is an integer relative to the axis.

6. A polygon mirror according to claim 5, wherein the polygon mirror has a molded construction.

7. A polygon mirror according to claim 6, wherein the polygon mirror is molded with a high-fluidity resin.

8. A scanning apparatus, comprising:

a polygon mirror including an axis about which the polygon mirror can be rotated, and a plurality of mirror surfaces, each having an inclination of angle non-zero $\theta$ $\theta \neq 90° \times n$; n is an integer relative to the axis;

means for rotating the polygon mirror about the axis; and means for projecting incident light beams onto the plurality of mirror surfaces to effect an optical scanning.

9. A scanning apparatus according to claim 8, further comprising means for transforming the optical scanning into an electrostatic image.

10. A scanning apparatus according to claim 9, wherein the means for transforming comprises a photosensitive drum.

11. A scanning apparatus according to claim 8, wherein the incident light beams are incident on the plurality of mirror surfaces at an angle $2\theta$ relative to a plane normal to the axis.

12. A scanning apparatus according to claim 8, wherein the polygon mirror has a molded construction.

13. A scanning apparatus according to claim 12, wherein the polygon mirror is molded with a high-fluidity resin.

* * * * *